United States Patent
Buhl et al.

Patent Number: 5,104,136
Date of Patent: Apr. 14, 1992

[54] STEERING TIE ROD FOR MOTOR VEHICLE

[75] Inventors: Reinhard Buhl, Bohmte; Burkhard Schäfer, Lemförde; Paul Westphal, Stemwede; Wolfgang Kleiner, Wagenfeld; Volker Grube, Diepholz, all of Fed. Rep. of Germany

[73] Assignee: Lemförder Metallwaren AG, Lemförde, Fed. Rep. of Germany

[21] Appl. No.: 524,151

[22] Filed: May 16, 1990

[30] Foreign Application Priority Data

May 17, 1989 [DE] Fed. Rep. of Germany ....... 3915991

[51] Int. Cl.⁵ .............................................. B62D 7/20
[52] U.S. Cl. ................................... 280/95.1; 188/371; 403/2
[58] Field of Search ............... 280/777, 95.1; 188/371, 188/373, 374, 375; 403/2, 375; 116/28 R, 203

[56] References Cited

U.S. PATENT DOCUMENTS

| | | | |
|---|---|---|---|
| 2,757,028 | 7/1956 | Latzen | 403/375 |
| 2,803,970 | 8/1957 | Sacks | 74/493 |
| 2,857,056 | 10/1958 | Dilworth | 188/371 |
| 3,479,902 | 11/1969 | Okamoto | 188/371 |
| 3,504,567 | 4/1970 | Ohashi | 74/492 |
| 3,741,032 | 6/1973 | Baker | 74/492 |
| 3,776,062 | 12/1973 | Ito | 74/492 |
| 3,915,486 | 10/1975 | Maeda | 188/374 |
| 4,057,355 | 11/1977 | Allison | 403/2 |
| 4,674,354 | 6/1987 | Brand | 280/777 |
| 4,968,058 | 11/1990 | Jones | 280/777 |

FOREIGN PATENT DOCUMENTS

3827854 12/1989 Fed. Rep. of Germany ..... 280/95.1

Primary Examiner—Charles A. Marmor
Assistant Examiner—Karin Tyson
Attorney, Agent, or Firm—McGlew & Tuttle

[57] ABSTRACT

A steering tie rod or similar strut for motor vehicles with a securing member (4) acting in the longitudinal direction of the steering tie rod is described, which securing member comes into action when a defined, axially acting load value is exceeded. In another variant of the present invention, the length of the steering tie rod may undergo a limited change after the securing member has been overcome, so that limited fitness for use of the vehicle is maintained.

7 Claims, 8 Drawing Sheets

STEERING TIE ROD FOR MOTOR VEHICLE

FIELD AND BACKGROUND OF THE INVENTION

The present invention pertains to the design of a steering tie rod for motor vehicles with a securing member acting in the longitudinal direction of the steering tie rod, whose length is limited when a defined axially acting load value is exceeded. The securing member has a tubular outer part and an inner part coaxially engaging with the outer part, the two parts engage with each other with radially directed deformations and limit the axial movement relative to one another.

Steering tie rods represent an essential component for the safety of the vehicle. On the other hand, the high requirements in terms of safety contrast with the requirement for the lowest possible weight of the steering tie rod. It is known that a certain buckling stability during the transmission of pressing forces is determined in advance, so that the steering tie rod or a component of the steering tie rod acts as a protective release member and buckles when a predetermined pressure load is exceeded, thus protecting other, substantially more expensive components from damage. In such a case of buckling, e.g., in case of collisions with another vehicle, traffic installations, structures, etc., the motor vehicle is no longer fit for use. It was suggested in West German Patent No. DE-PS 3827854, that for protection against overloads in the axial direction of pull, the steering tie rod should consist of a tube and a rod engaged with one end of this tube, which rod has a predetermined breaking point between its holder in the tube and the end of the tube and a projection between this predetermined breaking point and the tube end. The tube is provided between the projection and the tube end with a narrowed section which forms a stop during the breaking of the predetermined breaking point. In this arrangement, the predetermined breaking point leads to a limited elongation of the steering tie rod when the predetermined overload value in the direction of pull is exceeded, as a result of which the driving behavior of the vehicle is markedly altered. This predetermined breaking point is ineffective in a pressure direction.

SUMMARY AND OBJECT OF THE INVENTION

It is an object of the present invention to improve a steering tie rod so that both the pressure load limitation and the pulling load limitation can be predetermined with the same securing member also it is an object to reduce the axial forces acting in the steering tie rod during the change in length caused by the securing member in order to make it possible to maintain the vehicle in a state of limited ability to operate, if desired, when the overload protection mechanism has acted.

The present invention accomplishes this task by providing a steering tie rod formed of an outer part and an inner part and securing member means which engages the outer and inner parts relative to each other with radially directed deformations. This limits the axial movement relative to one another and causes connecting of the outer part and the inner part in a positive-locking manner to provide at this connection an axial load-bearing capacity for defined load values. This connection also causes interruption of the axial positive-locking connection when the defined load value is exceeded.

Due to this design of the securing member, the maximum load of the steering tie rod can be accurately defined in the direction of pull as well as the pressing direction. The positive-locking connection of the tubular outer part and the inner part engaged therewith may be achieved by non-cutting shaping, force fit designs or the like, in a known manner.

Thus, according to the object of the present invention, a limited change in the length of the steering tie rod takes place when the predetermined maximum load value is exceeded, as a result of which a considerable part of the overload forces is transformed into deformation forces or friction forces, so that the steering tie rod as a component remains intact and the motor vehicle can be used under more or less limited, but at any rate markedly altered conditions. However, the limited change in the length of the steering tie rod must lead to a marked indication of the limited fitness for use of the motor vehicle. This must be done in order to indicate to the driver that this limited fitness use exists or to make it impossible to use the motor vehicle under other than limited conditions.

The means for limiting the axial change in the length of the steering tie rod are designed so that substantially stronger overload forces are needed to overcome them. This makes it possible to locate the response of the securing member in a range which is below the load value of a protective release member which would be the possible buckling of the steering tie rod or for rupture of the steering tie rod itself.

Further design characteristics for the advantageous embodiment of the object of the present invention are contained in the subclaims. These design characteristics will be explained on the basis of the following description of exemplified embodiments.

The various features of novelty which characterize the invention are pointed out with particularity in the claims annexed to and forming a part of this disclosure. For a better understanding of the invention, its operating advantages and specific objects obtained by its uses, reference is made to the accompanying drawings and descriptive matter in which preferred embodiments of the invention are illustrated.

BRIEF DESCRIPTION OF THE DRAWINGS

In the drawings:

FIGS. 8-13 are sectional views of further embodiments corresponding to FIG. 7, wherein:

DETAILED DESCRIPTION OF THE PREFERRED EMBODIMENTS

Figure 1:
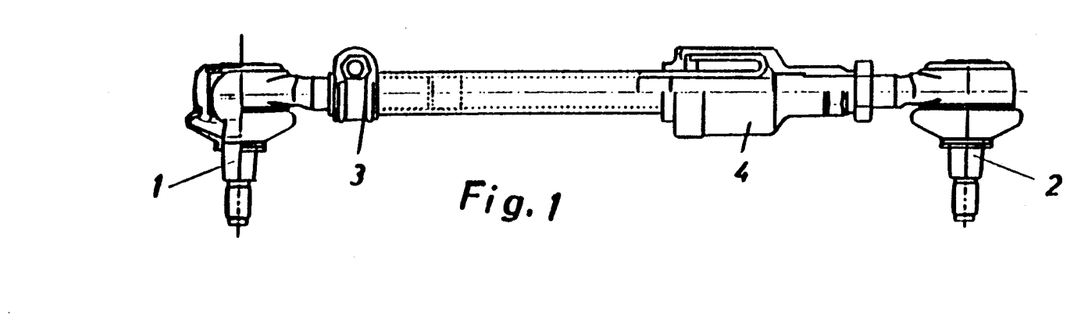
FIG. 1 is a side view of a steering tie rod according the invention.

FIG. 1 shows a steering tie rod of a one-part, straight design, whose ends can be connected to the steerable wheels of a motor vehicle by means of ball joints 1 and 2. The length of the steering tie rod is continuously adjustable by components engaging with one another and can be fixed by means of a screw clamp 3 in the case of this example. In the conventional design, such a steering tie rod is formed as a protective release member such that when a predetermined load value is exceeded, it will buckle in the direction of the pressure, as is represented graphically in FIG. 2A.

Figure 2:
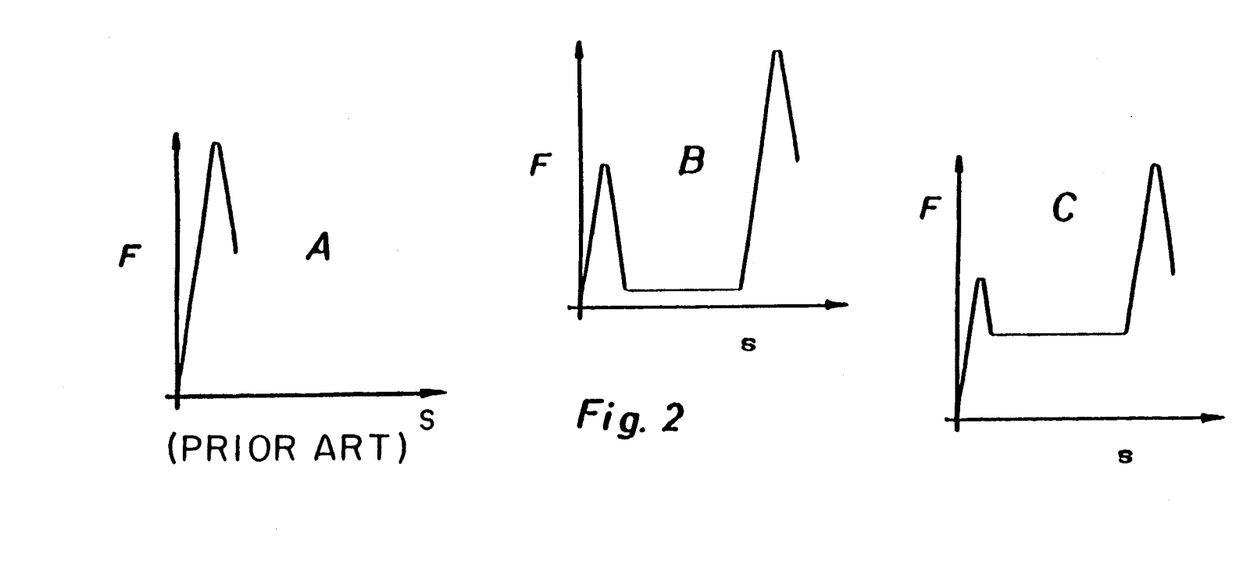
FIG. 2A is a load diagram of a conventional steering tie rod.
FIG. 2B is a load diagram of a steering tie rod according to the present invention.
FIG. 2C is a load diagram of a preferred embodiment of a steering tie rod according to the present invention.

In a section of the steering tie rod, there is provided a securing member 4, which responds, due to its design, in the direction of pull and advantageously also in the pressing direction when a predetermined load value is exceeded. This load value should be lower than the value of the breaking load of the components of the steering tie rod proper, as is apparent from a comparison of the load Diagrams 2A and 2B. The components of the steering tie rod are thus protected against overload by the securing member 4.

Figure 3:
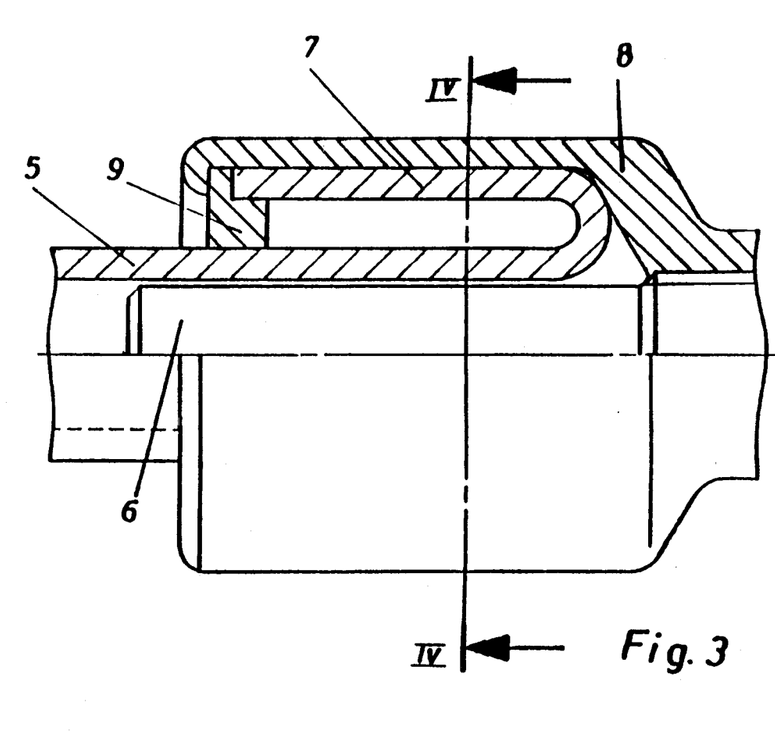
FIG. 3 is a cross sectional view of the securing member according to FIG. 1 on a larger scale.
Figure 4:
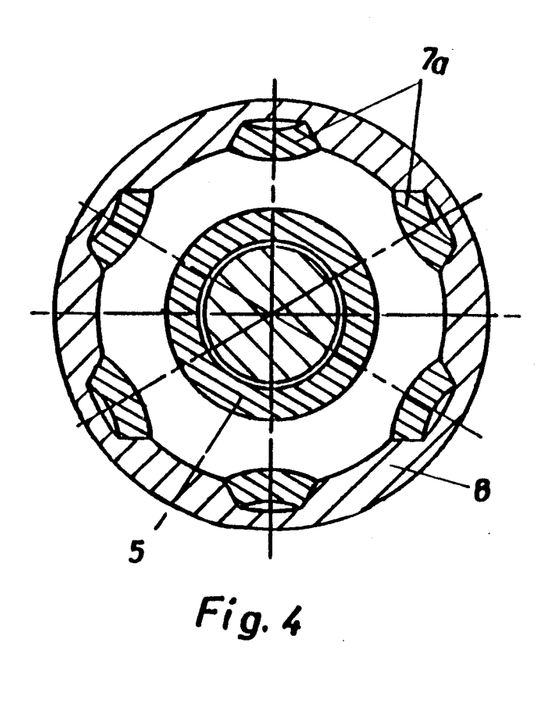
FIG. 4 is a sectional view taken along line IV—IV in FIG. 3.

In the example shown in FIGS. 3 and 4, the securing member 4 consists of a tubular outer part 5 and an inner part 6 engaging with it. The outer end of the outer part 5 is designed as a cuff 7, in which tongue-shaped straps 7a act as deformable members and are formed by elongated slot-like recesses and are bent back through 180°. A sleeve 8 surrounds the straps 7a and one end of it is attached to the inner part 6, whereas the other end connects the straps 7 to one another via a support ring 9. The ring 9 is axially slidable on the outer part 5, so that the inner part 6 with the sleeve 8 is axially displaceable relative to the outer part 5 both in the direction of pull and in the pressing direction, while the straps 7 undergo deformation. The maximum load value of such a securing member acting in the axial direction can be determined by the cross section of the material of the straps, the hardness of the material used for the straps, and possibly also the friction fit of the ring 9 on the outer circumference of the outer part 5. In the case of overload in the direction of pull, the straps 7a are uncoiled against the outer circumference of the inner part 6 until they finally reach their extended position, and prevent any further change in length, so that limitation of the change in length will be achieved. In the case of overload in the pressing direction, the straps 7a are wound up more firmly until the straps 7 will be supported by the sleeve 8 in the bending zone, and limitation of the change in length is thus achieved as well. It is also possible to generate switching impulses which indicate to the driver of the motor vehicle that the securing member has responded and consequently limited fitness for use of the motor vehicle has begun.

Figure 5:
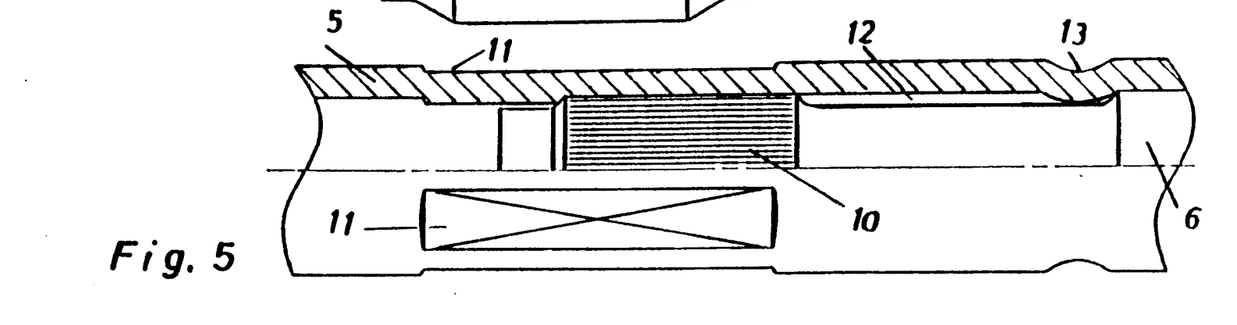
FIG. 5 is a partial longitudinal sectional view taken through a securing member with force fit or friction fit between the outer component and the inner component.

In the embodiment according to FIG. 5 the deformable members consist of, a force fit section 10 provided over a limited longitudinal section of the inner part 6, which cooperates with a corresponding design on the inner circumference of the outer part 5. The length and the surface structure of the force fit surfaces are designed for the maximum load, so that the force fit loosens when this load value is exceeded. A knurled or milled surface on the force fit section 10 of the inner part 6 is shown, and a partial depression 11 is provided, by which the force fit connection of the two parts is achieved. Adjacent to the force fit section 10, the inner part 6 is provided with a longitudinally extending recess 12 or with a plurality of recesses distributed over the circumference, into which a lug 13 or the like, which is pressed into the outer part 5 from the outside, extends. After loosening of the force fit between the inner part 6 and the outer part 5, the lug slides in the longitudinally extended recess 12 until it comes into contact with its end limitation. The limitation of the change in the length of the steering tie rod, which is thus brought about when the securing member responds, is achieved in the direction of pulling the example shown in FIG. 5. It is also possible to provide length limitation marks acting in the pressing direction in the same way.

Figures 6, 7:
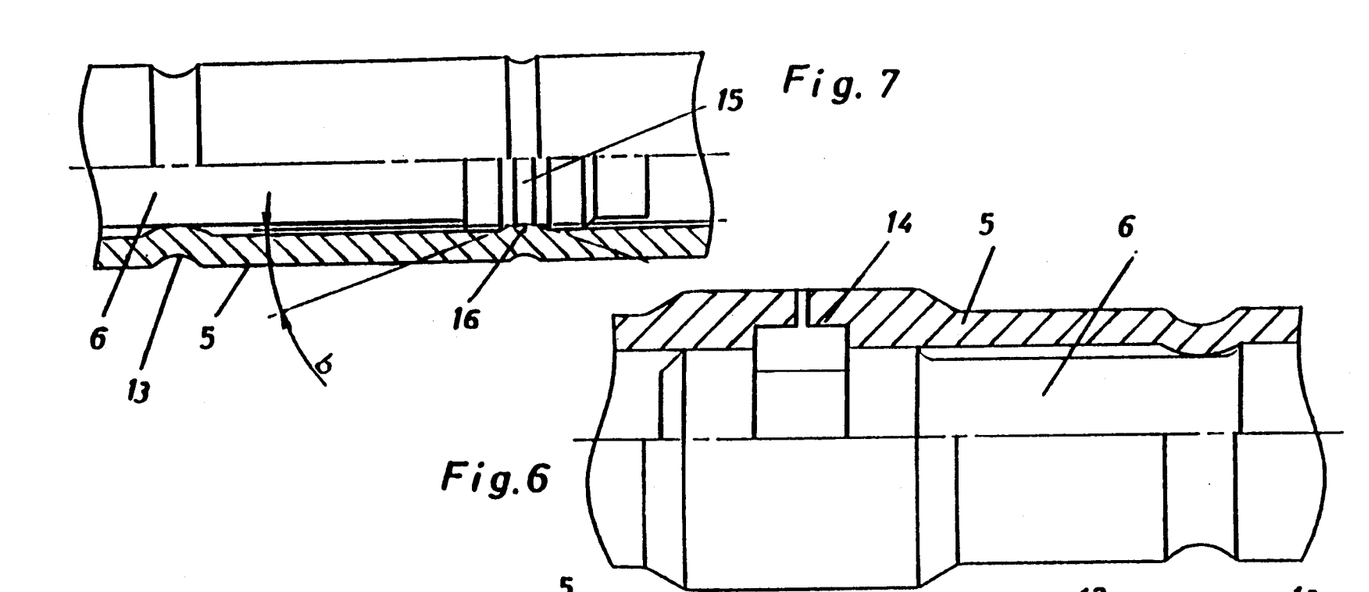
FIG. 6 is a cross sectional view of an embodiment with a shear member between the outer component and the inner component.
FIG. 7 is a cross sectional view of an embodiment with a positive-locking connection of the outer component and the inner component by a forming of the material.

FIG. 6 shows an embodiment in which the deformable member is a retaining ring 14 designed for shearing is arranged between the outer part 5 and the inner part 6. The retaining ring 14 may consist of a self-curing filling composition which is introduced in the liquid state into an annular groove formed by and between the outer part 5 and the inner part 6. The shear cross section for axial overload can be easily calculated on the basis of the known material data. A lug 13 of the outer part reaches into a longitudinally extending groove 12 of the inner part in this arrangement as well in order to achieve limitation of the change in length of the steering tie rod during shearing off of the ring 14.

FIG. 7 shows an embodiment in which a tubular outer part 5 and a corrugated inner part 6 engage in each other due to non-cutting shaping or machining to form deformable members. A groove 15 milled circumferentially on the circumference of the inner part 6 is shown; a bead 16 pressed into the groove 15 from the outside produces a positive-locking connection, in which the angular positions b of the flanks of the groove 15 can be used to determine the maximum load value. When this maximum load value is exceeded, the bead 16 slides out of the groove 15, while the outer part 5 is deformed, so that the outer part and the inner part are axially movable relative to one another. An axial limitation of this change in length can also be achieved by a lug 15 or the like in the outer part, which engages in a longitudinally extending groove 12 of the inner part. The loads that can be transmitted axially depend on the angle b and the properties of the material of the outer part, as well as the dimensioning of the latter.

Figure 8:
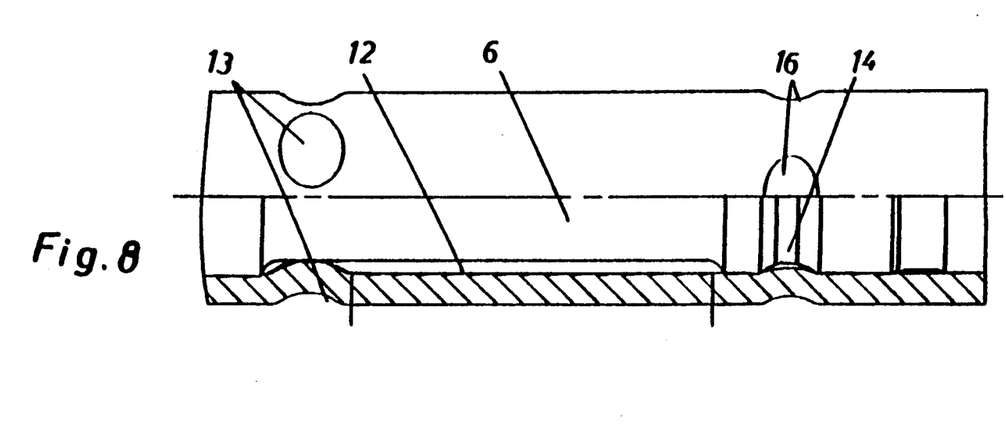
Figure 9:
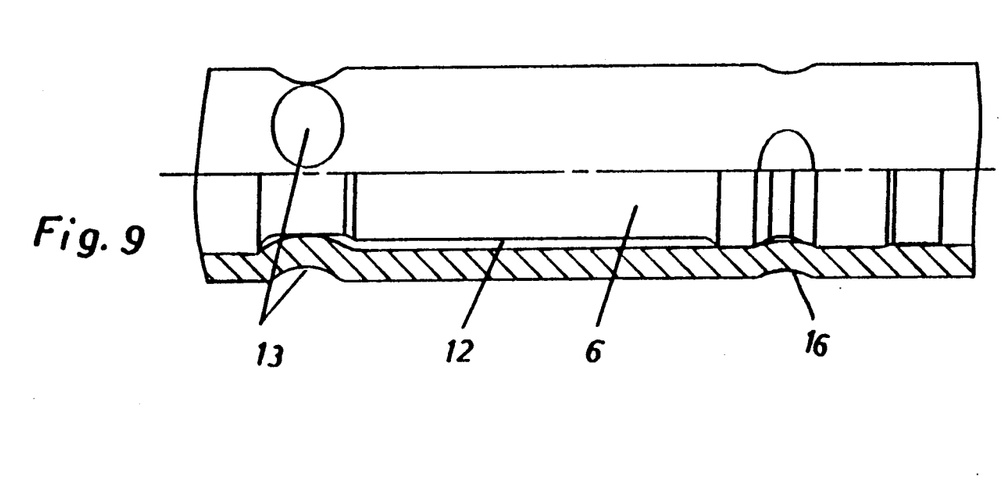
Figure 10:
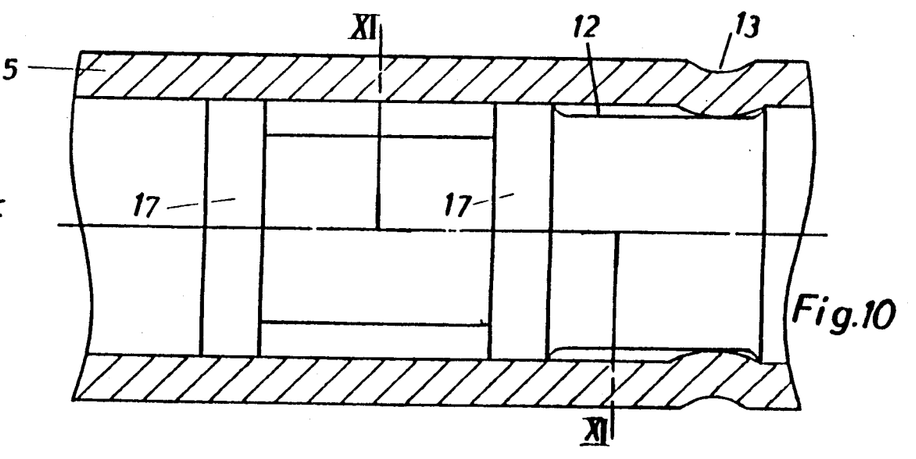
Figure 11:
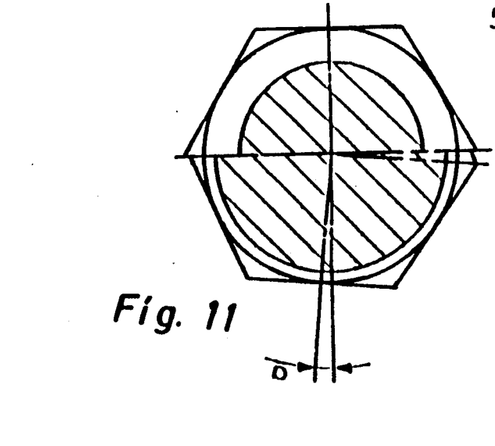
FIG. 11 is a cross sectional view along line XI—XI in FIG. 10.

FIGS. 8 and 9 show designs comparable to the embodiment in FIG. 7, but with a different pattern of forces. In the arrangement according to FIG. 7, the pattern of forces corresponds approximately to the Diagram of FIG. 2B, while the pattern of forces of the arrangement according to FIGS. 8 and 9 corresponds approximately to the Diagram of FIG. 2C. The deformations of the outer part 5 are more punctiform in the latter embodiments, so that only lug-like projections provided on the inner circumference of the outer part 5 engage either in the circumferential groove 15 or in the longitudinally extending groove 12 of the inner part 6. In the design according to FIG. 8, the inner part 6 and the outer part 5 may have polygonal cross sections in the area between the lugs 13 and the bead 16 and be pressed together radially. In contrast, FIG. 9 shows an example in which the lugs 13 engage in a section of the inner part 6 with an all-round reduced diameter, so that radial deformation of the outer part 5 makes it possible for the securing member to respond both in the direction of pull and in the pressing direction. In the embodiment according to FIGS. 10 and 11, the connection between the outer part 5 and the inner part 6, which is needed for the transmission of an axial force, is achieved with torsion spring forces. The inner part 6 or the outer part 5 acts as the torsion spring, as desired. The two parts engage in each other with polygonal cross sections, which are provided on shoulders 17 of the inner part at least in axially limited areas, and these polygonal cross sections engage in staggered polygons provided on the inner circumference of the outer part. On assembly, one of the two parts must be rotated with great force in order to push the polygons into each other. The elasticity of the material now leads to jamming, and this jammed connection creates a deformable member and is pushed apart axially when a maximum load value is exceeded. A limitation of this change in length is also achieved by longitudinally extending grooves 12 and lugs 13 or the like engaging with same. Instead of the longitudinally extending grooves 12, it is also possible to provide, in this embodiment as well as in the embodiments explained before, a section with reduced diameter, in which circumferentially extending beads of the outer part, instead of lugs, engage.

Figure 12:
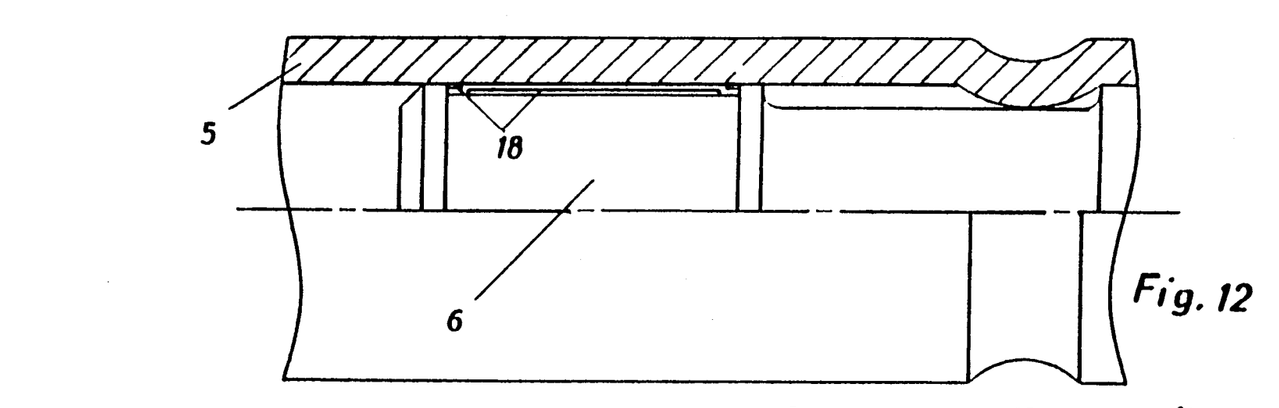

In the embodiment according to FIG. 12, the axially positive-locking connection is achieved with one or several spring elements 18, which are arranged either on the internal circumference of the outer part 5 or on the external circumference of the inner part 6.

Figure 13:
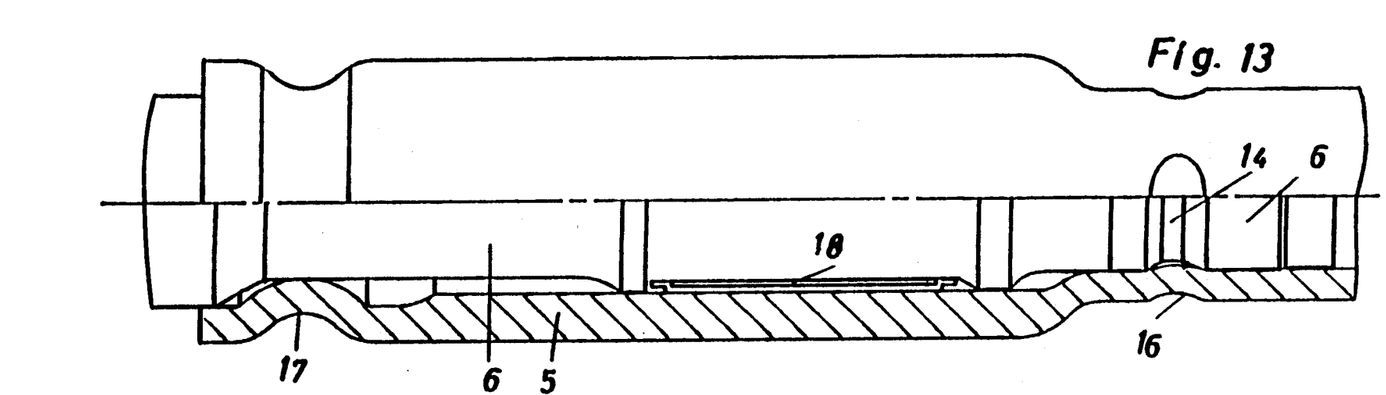

FIG. 13 shows a combination of the design according to FIGS. 8 and 9 with a design according to FIG. 12. Axially positive-locking engagement of a bead 16 with a circumferential groove 15 of the inner part 6 is arranged offset relative to a positive-locking connection of the inner part to the inner part 6 by means of spring member 18, whose action was explained in connection with FIG. 12. A bead 16 pressed into the outer part from the outside engages in an area of reduced cross section, so that the axial movement in the pressing direction of the inner part 6 relative to the outer part 5 is limited by the length of this area of reduced diameter. The change in length in the direction of pull is limited by a circumferential groove 17.

Figure 14:
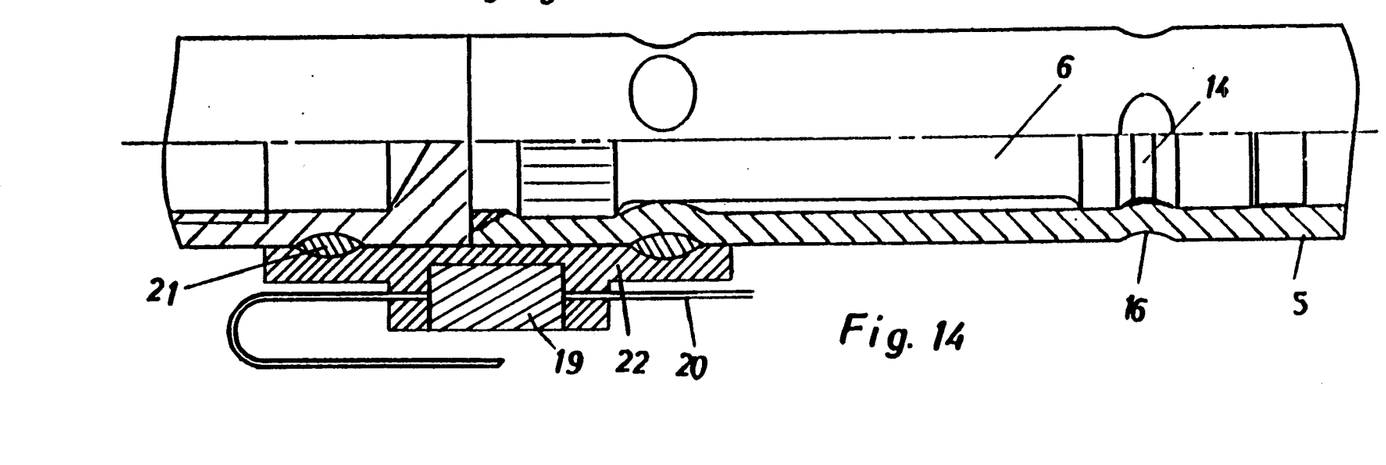
FIG. 14 is a longitudinal sectional view through a securing member with a switching member for generating a signal.

Finally, FIG. 14 shows an example in which a contact is provided for generating a signal indicating the condition of the securing member to the vehicle operator FIG. 14 shows additionally the means for the positive-locking connection of the inner part 6 and the outer part 5 by a circumferential groove 14 provided on the circumference of the inner part and a bead 16 embossed on the outer part from the outside. A contact body 19 is shown in a wire 20, which is broken in the case of a change in the length of the steering tie rod, so that the wire 20 is interrupted. However, the contact body 20 may also be designed so that in the pressing direction, e.g., due to a change in its resistance, it generates a signal that is then transmitted in a manner perceptible to the vehicle operator. A signal transmitter according to this embodiment may be fastened, e.g., bonded to the outer part 5 with its housing part 21, on one hand, and to the inner part with housing part 22 6, on the other hand.

In the embodiments according to FIGS. 5, 6, 7, 10, 12, and 14, basically only a small resistance need be overcome for changing the length of the steering tie rod, so that these devices consume only a small amount of overload forces due to work of deformation. An arrangement according to the example shown in FIGS. 3 and 4 as well as 8, 9, and 13 behaves differently. Here, considerable forces are required for changing the length of the steering tie rod, so that a correspondingly large percentage of the overload forces is consumed by the work of deformation. While designs according to the examples shown in FIGS. 5, 6, 7, 10, 12, and 14 behave approximately as illustrated in the Diagram of FIG. 2B, the embodiment in FIGS. 3 and 4 as well as 8, 9, and 13 acts according to the Diagram of FIG. 2C. This clearly shows the destruction of a considerable percentage of the overload energy by work of deformation in the securing member 4.

Figure 15:
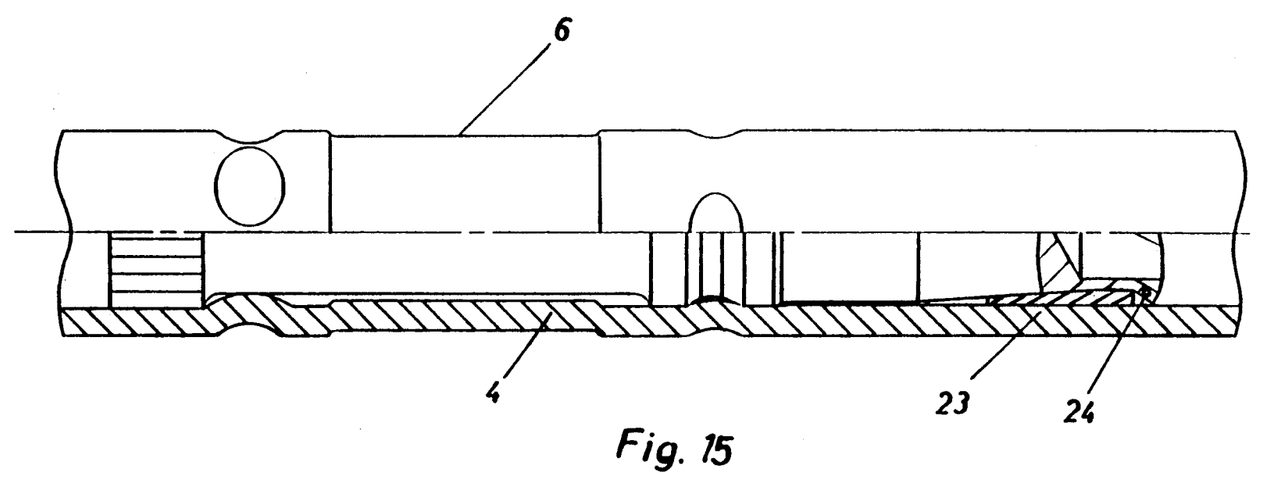
FIG. 15 is an axial sectional view through an embodiment with a locking mechanism consisting of at least one wedge segment to prevent return into the starting position.

FIG. 15 shows an embodiment in which a locking mechanism, which consists of one or several wedge segments 23 distributed over the circumference. The arrangement prevents the tubular outer part 5 and the inner part 6 from returning into their starting position after a change in the axial length. The wedge segments 23 are arranged between the two parts, the outer part and the inner part, wherein the wedge surface or wedge surfaces cooperates (cooperate) with countersurfaces provided on the outer part 5 and on the inner part 6, so that the two parts are locked together by a wedge effect when they are moving in the opposite direction after a change in length. The wedge segment or wedge segments 23 is (are) carried along during the change in length as a result of deformed edge parts 24, which extend behind the segment(s) 23. The wedge segments 23 may consist of a metallic or artificial-synthetic material.

Figure 16:
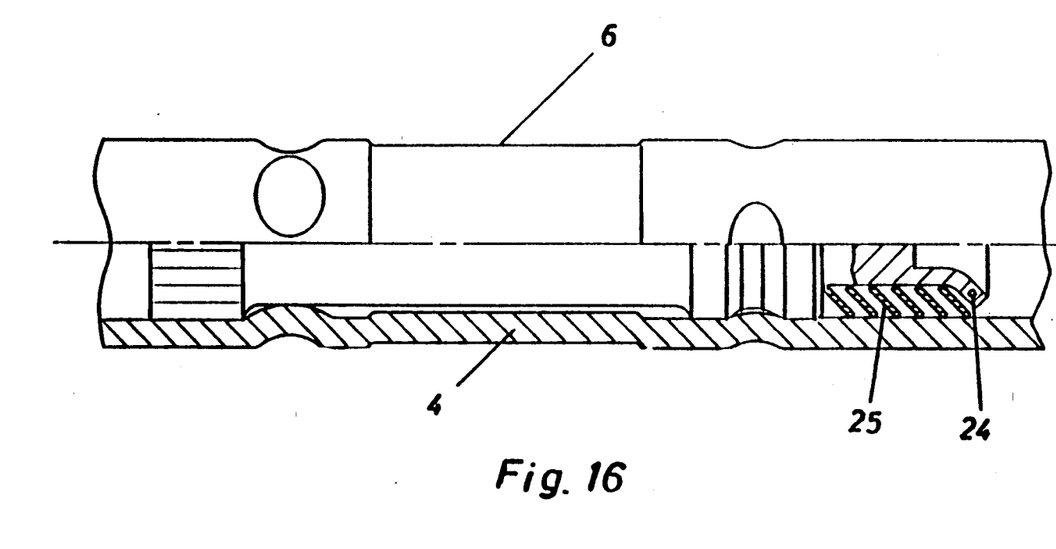
FIG. 16 is an axial sectional view according to FIG. 15 with a locking mechanism consisting of a spring.

In the example according to FIG. 16, the locking mechanism consists of a spring 25, which surrounds the inner part 6 during a possible return motion of the outer part 5 and the inner part 6 into the starting position after a change in length, it expands between the two parts, thus locking together the two parts. Both a plate spring and a coil spring are suitable for this purpose. Such a spring is also held by a deformed edge part 24 in the recess provided for receiving the spring.

While specific embodiments of the invention have been shown and described in detail to illustrate the application of the principles of the invention, it will be understood that the invention may be embodied otherwise without departing from such principles.

What is claimed is:

1. A steering tie rod for motor vehicles, comprising: an outer part, and an inner part coaxially positioned within said outer part, said outer part and said inner part cooperate to form a steering tie rod and, securing member means connecting said outer part and said inner part to each other in an axially positive-locking manner to provide an axial load-bearing capacity of the connection between the outer part and the inner part for a defined load value, said securing member means includes a protective release member designed for a defined load value, said securing member means including deformable members which deform upon overload forces below said defined load value, said securing member means consists of an end of said outer tubular part formed into straps by elongated longitudinal slot-like recesses, said straps being bent back through substantially 180 degrees, a sleeve having a first end surrounding said straps and said first end of said sleeve being connected to an end of said straps by a support ring, said sleeve having a second end connected to said inner part.

2. A steering tie rod according to claim 1, further comprising switching means for generating a signal during an axial displacement of said outer part with respect to said inner part.

3. A steering tie rod in accordance with claim 1, wherein:
said deformable members are designed to absorb said overload forces in both tensile and compressional directions before said protective release member is released.

4. A steering tie rod for motor vehicles, comprising: an outer part, and an inner part coaxially positioned within said outer part, said outer part and said inner part cooperate to form a steering tie rod and, securing member means connecting said outer part and said inner part to each other in an axially positive-locking manner to provide an axial load-bearing capacity of the connection between the outer part and the inner part for a defined load value, said securing member means includes a protective release member designed for a defined load value, said securing member means including deformable members which deform upon overload forces below said defined load value, said outer tubular part engages a circumferential groove provided on an outer circumference of said inner tubular part, said outer tubular part having a bead embossed from the outside for locking with said circumferential groove in an axially positive-locking manner;
an additional circumferential groove on said outer circumference of said inner tubular part, and said outer tubular part having an additional bead embossed from the outside for locking with said additional circumferential groove, said additional groove and said additional bead forming an additional securing member means having a different defined load value and deformable members than said securing member means.

5. A steering tie rod according to claim 4, wherein said securing member means includes a locking mechanism which prevents said inner part and said outer part from returning to an initial starting position after axial displacement has occurred causing a change in the length of the steering tie rod.

6. A steering tie rod for motor vehicles, comprising:
an outer tubular part, and an inner part coaxially positioned within the outer part, said outer part and said inner part cooperate to form a steering tie rod and, securing member means connecting said outer part and said inner part to each other in an axially positive-locking manner to provide an axial load-bearing capacity of the connection between the outer part and the inner part for a defined load value, said securing member including radially directed elements for interrupting the axial positive-locking connection when a defined load value is exceeded, said securing member means includes a locking mechanism which prevents said inner part and said outer part from returning to an initial starting position after axial displacement has occurred causing a change in the length of the steering tie rod, said locking mechanism includes at least one annular wedge segment which cooperates with a counter surface on said inner part and a counter surface on said outer part.

7. A steering tie rod according to claim 6, wherein said locking mechanism includes a spring which surrounded said inner part and generates radial locking forces between said inner part and said outer part during a movement in a direction opposite to the movement after a change in axial length.

* * * * *